United States Patent
Takenouchi et al.

[11] 3,891,051
[45] June 24, 1975

[54] SCAFFOLDING UNIT FOR SHIPBUILDING

[75] Inventors: Senji Takenouchi, Tokyo; Tautomu Yanai, Matsudo; Takamasa Matsumoto, Tokyo; Hiroyoshi Ohtani, Niiza, all of Japan

[73] Assignee: Ishikawajima-Harima Jukogyo Kubushiki, Tokyo, Japan

[22] Filed: Sept. 28, 1973

[21] Appl. No.: 401,955

Related U.S. Application Data
[62] Division of Ser. No. 219,084, Jan. 19, 1972, abandoned.

[52] U.S. Cl. ................................. 182/63; 182/2
[51] Int. Cl. .............................................. E04g 1/18
[58] Field of Search ............. 182/115, 63, 131, 132, 182/130, 178, 179, 12, 141, 2

[56] References Cited
UNITED STATES PATENTS

| | | | |
|---|---|---|---|
| 3,256,955 | 6/1966 | Izmirian | 182/130 |
| 3,516,512 | 6/1970 | Kupke | 182/131 |
| 3,537,236 | 11/1970 | Fridley | 182/63 |

Primary Examiner—Reinaldo P. Machado
Attorney, Agent, or Firm—Scrivener Parker Scrivener & Clarke

[57] ABSTRACT

A scaffolding unit for shipbuilding is provided which comprises a main body which in turn comprises a carriage and a plurality of scaffoldings or working platforms erected upon the carriage, and a pair of wings disposed on the longitudinal sides of the main body for the works of decks between the hatches, the decks outside of the hatches and the side shell platings.

1 Claim, 10 Drawing Figures

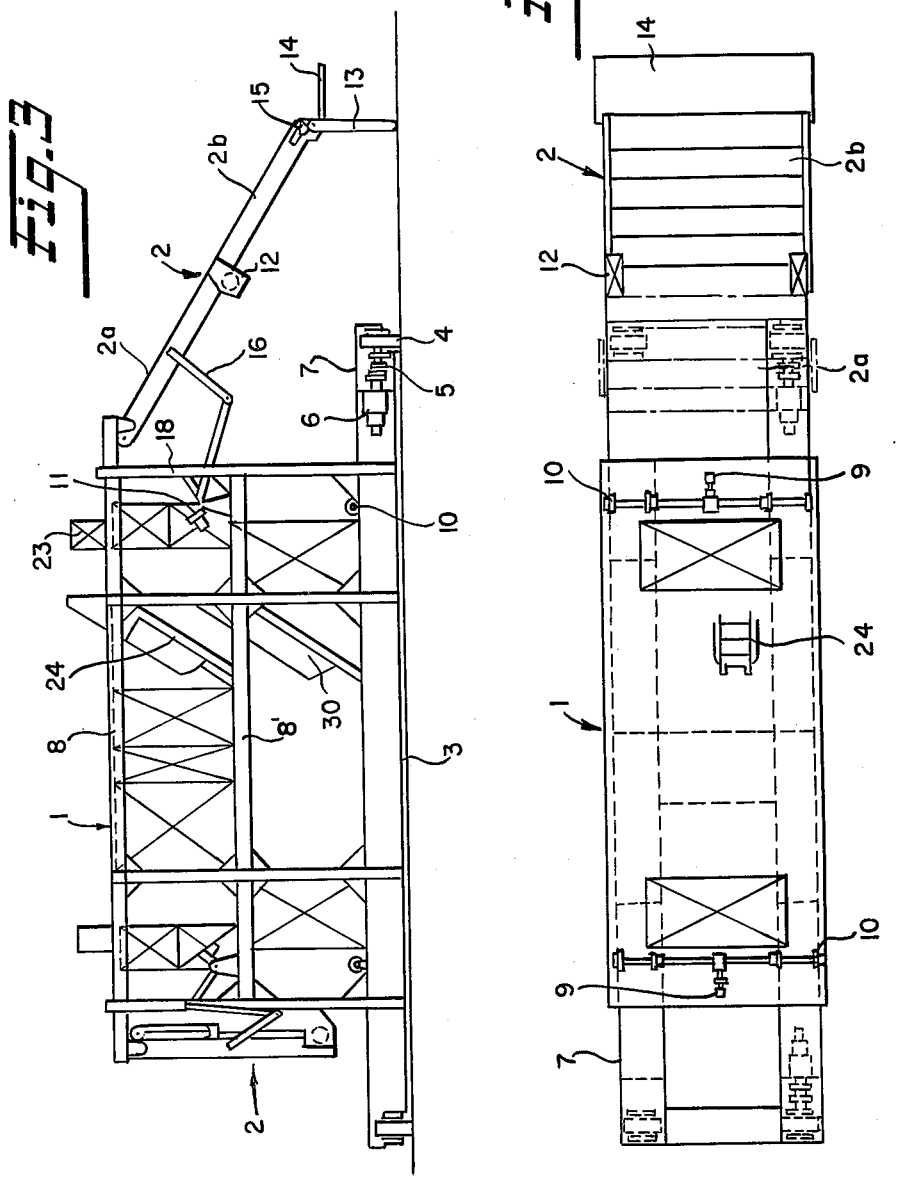

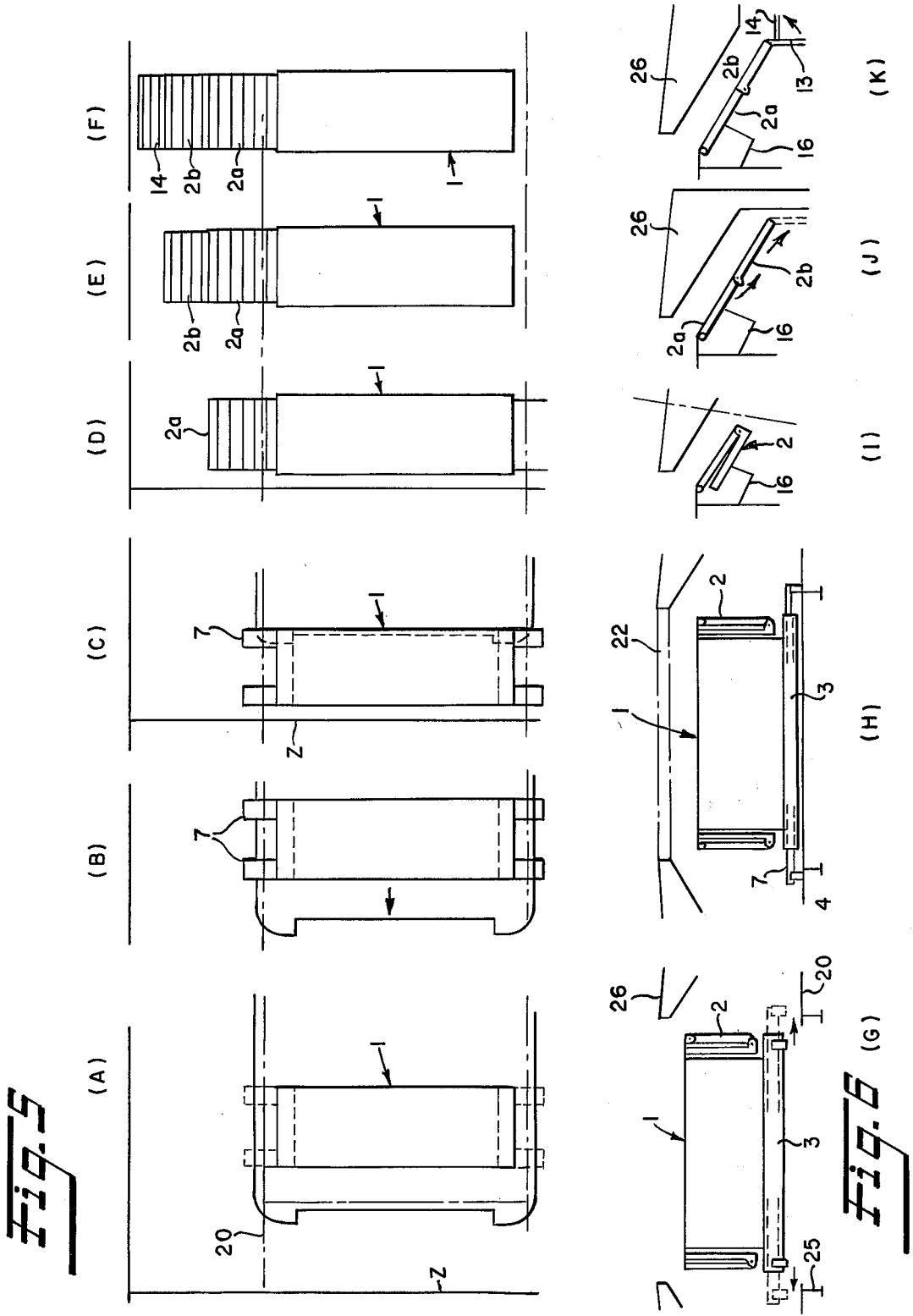

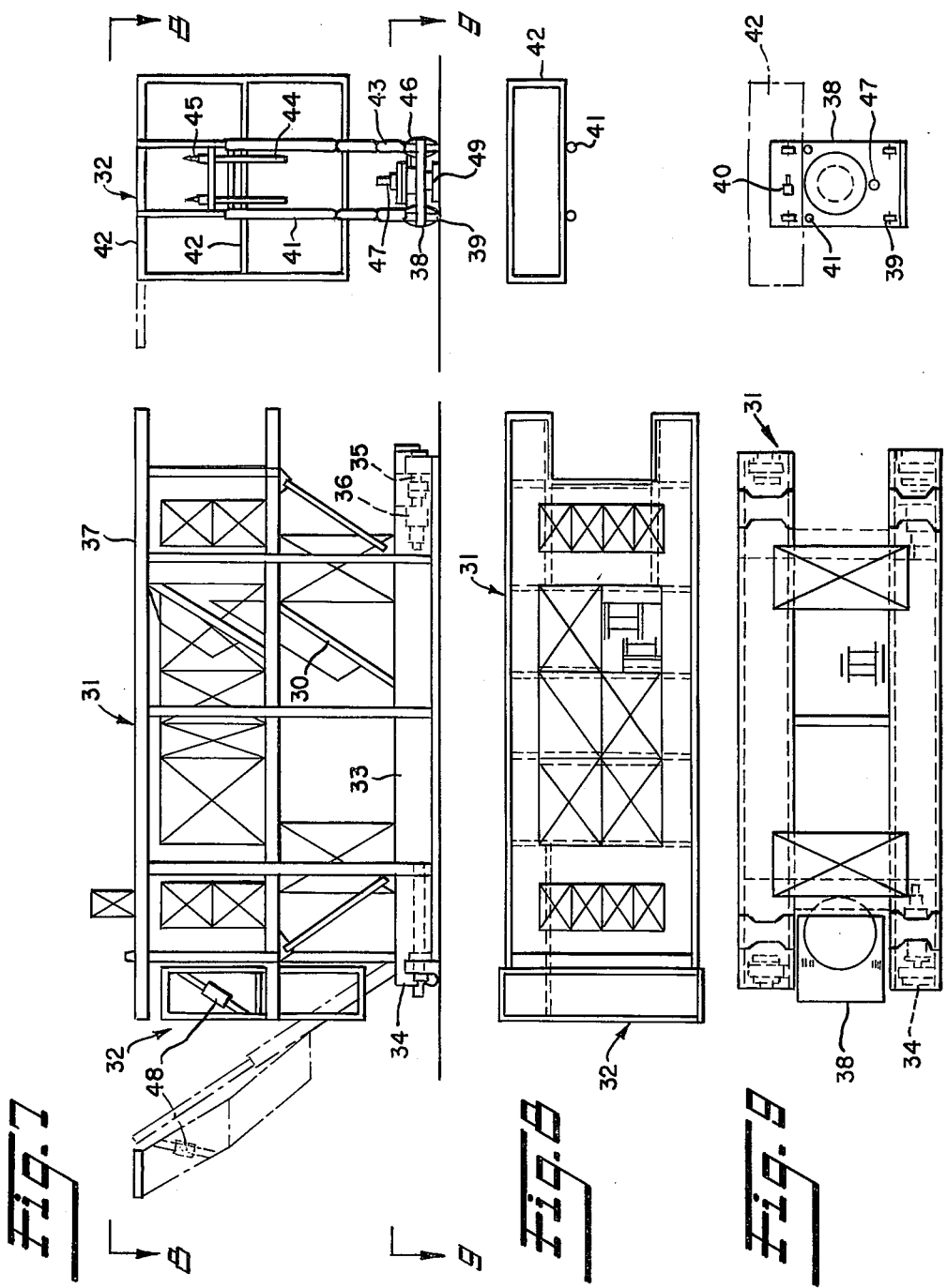

SCAFFOLDING UNIT FOR SHIPBUILDING

This is a division of application Ser. No. 219,084, filed Jan. 19, 1972 now abandoned.

In building a large vessel, the scaffoldings are usually set up and removed for welding various hull structures at considerable heights of the vessel on the ways. In the prior art method, a large number of scaffolding erection pieces are attached to the hull structures; supporting mans such as brackets, arms or the like are bolted to these erection pieces; the working platforms such as planks or the like are securely fixed with wire or the like to the supporting means; and the rails are attached. The scaffoldings are used for welding with the power source for welding and illumination, acetylene gas and oxygen for gas cutting, water for relieving strains, air compressor source for grinders and the like.

After the work on the ways is accomplished, the rails, working platforms, and brackets or arms are removed, and the scaffolding erection pieces are cut off by gas burners. The scaffolding materials are removed out of the vessel by the cranes or by workers.

The prior art scaffoldings of the type described above have the defects that a large number of scaffolding materials are required; it takes a long time to set up or remoove the scaffoldings by many labors; the transportation of various machines, equipments and the like at considerable heights is dangerous, it takes a long time to remedy the spots at which the scaffolding erection pieces are welded; and a long time is consumed for installation and removal of various power sources.

The present invention was made to overcome these defects, and provides a scaffolding unit for shipbuilding characterized by comprising a movable main body upon which are erected a plurality of working platforms, and a pair of wings disposed on the longitudinal sides of the main body for the works of the decks between the hatches, the decks outside of the hatches and the side shell platings.

The above and other objects, features and advantages of the present invention will become more apparent from the following description of the preferred embodiments thereof taken in conjunction with the accompanying drawings.

FIG. 3 is an explanatory front view of a first embodiment of a scaffolding unit of the present invention which is shown as being set up on the inner bottom plating for welding the structures between the upper and second decks;

FIG. 4 is a top view thereof;

Figure 10:
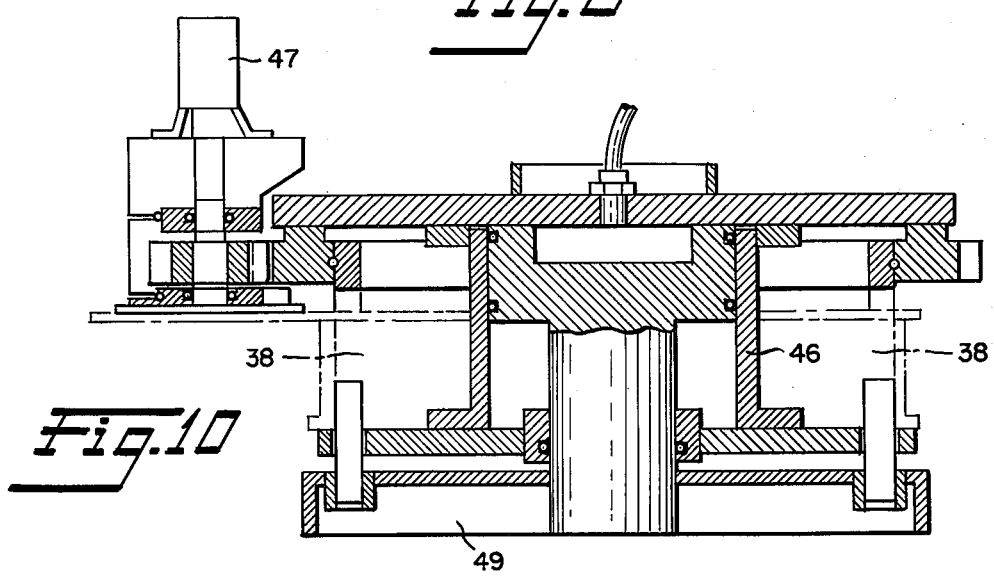

FIG. 5 (A) – 5 (F) are top views of the unit shown in FIGS. 3 and 4 used for explanation of setting up of the unit for operative positions;

FIGS. 6 (G) – 6 (K) are front views thereof corresponding to FIGS. 5 (A) – 5 (F) respectively;

FIG. 7 is an explanatory front view of a second embodiment of a scaffolding unit in accordance with the present invention which is shown as being set up on the inner bottom plating for welding the structures between the inner bottom and the second deck;

FIG. 8 is a top view thereof looking in the direction indicated by the line VIII—VIII of FIG. 7;

FIG. 9 is a sectional view thereof taken along the line IX—IX of FIG. 7;

FIG. 10 is an view for explanation of a hoisting and rotary device of a wing of the unit shown in FIGS. 7 – 9;

FIGS. 11 (A) – 11 (E) are top views of the unit shown in FIGS. 7 – 9 used for explanation of setting up of the unit for operative positions;

FIGS. 12 (F) – 12 (H) are front views thereof corresponding to FIGS. 11 (A) – 11 (E) respectively.

Figure 1:
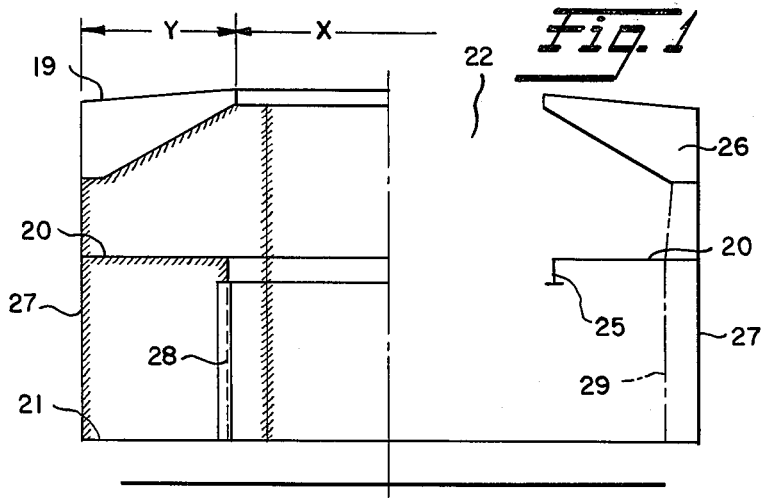
FIG. 1 is a schematic sectional view of the structure of a vessel for which is used the scaffolding unit in accordance with the present invention.
Figure 2:
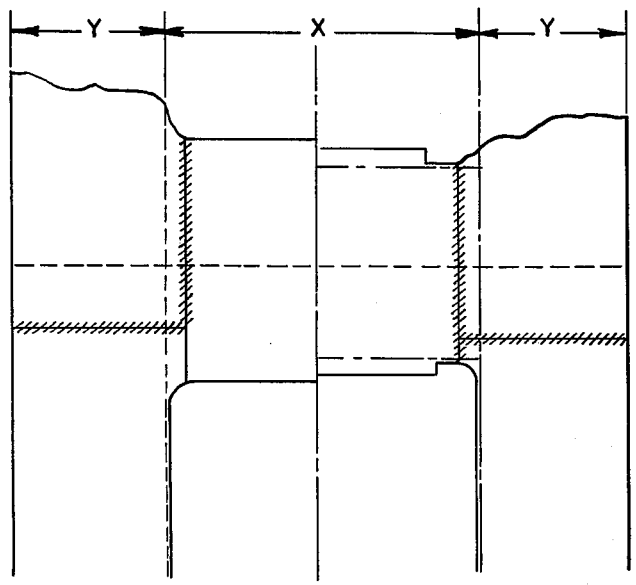
FIG. 2 is a top view thereof.

Referring to FIG. 1 illustrating a section of the structure of a vessel, reference numeral 19 designates an upper deck; 20, a second deck; and 21, an inner bottom plating. A shipbuilding scaffolding unit shown in FIG. 3 is movably supported on the second deck 20 between the upper and second decks 19 and 20. The scaffolding unit comprises in general a main body 1, which in turn comprises a carriage having wheels for running on the second deck, the spacing between each pair of wheels being varied as will be described hereinafter, and a plurality of working platforms erected upon the carriage; and a pair of wings 2 each of which is pivoted to the longitudinal side of the uppermost working platform of the main body 1, and is extendable and retractable as will be described in more detail hereinafter.

More particularly, as shown in FIGS. 3 and 4, the main body 1 comprises, in general, a carriage 3 having a plurality of wheels 4 for running on the second deck 20, and a pair of transverse triggers 7 having a plurality of driving motors 6 which are coupled to the wheels 4 through Schmidt type couplings 5; an upper and lower working platforms 8 and 8' upon which are supported various machines for shipbuilding such as welding machines and the like (not shown), and which are erected upon the carriage 3; trigger extending devices each comprising a drive motor 9 mounted upon the carriage and sprocket wheels 10 for horizontally extending the triggers 7; and a pair of drive motors 11 mounted upon the transverse sides of the lower working platform 8' for extending the wings 2. In operation, the triggers 7 are extended out of the main body 1 to ride on the second deck 20. The overall dimensions of the shipbuilding scaffolding unit are so determined as to be lowered or lifted through a hatch 22 (see FIG. 1).

As shown in FIGS. 3 and 4, each of the wings 2 comprises, in general, an upper wing section 2a and a lower wing section 2b. Each of the upper and lower wing sections 2a and 2b has a plurality of working platforms or steps running more or less parallel to the centerline, and the upper and lower wing sections 2a and 2b are foldably coupled to each other through a pair of motor-and-worm-gearbox assemblies 12. The lower wing section 2b has a lowermost working platform 14 and pillars 13 both of which are foldably pivoted to the lower end of the lower wing section 2b. A pair of motor-and-gearbox assemblies 15 are also mounted at the lower end of the lower wing section 2b for extending the pillars 13 and the platform 14. The upper end of the upper wing section 2a is pivotably fixed to the longitudinal side of the upper working platform 8, and an arm 16 which is pivoted to the center of the upper wing section 2a is coupled to the drive motor 11 on the lower working platform 8' through a screw rod 18 so that the upper wing section 2a may be transversely extended. The lower wing section 2b is extended transversely out of the upper wing section 2a by the motor-and-worm-gearbox assemblies 12, and the pillars 13 and the platform 14 are extended transversely of the lower wing section 2b by the motor-and-gearbox assemblies 15.

In FIGS. 1 – 4, reference numeral 23 designates a gas-and-water supply unit mounted on the upper working platform 8; 24, a ladder; 25, a girder of the second deck 20; 26, a top side tank; 27, a side shell plating; 28, a deep web bracket; 29, a side wall; 30, a ladder; X deck between the hatches; Y, a deck outside of the hatch; and Z, a transverse bulkhead.

The shipbuilding scaffolding unit with the construction described above with reference to FIGS. 3 and 4 is run on the second deck 20 for erection and welding of upper hull structures. The platforms of the unit are used for erecting and joining the decks X between the hatches and transverse bulkheads Z. The wings 2 are located below the decks Y outside of the hatches for welding the undersurface of the upper deck 19 and the side shell platings 27.

More particularly, the wings 2 are retracted and folded as shown at the left of FIG. 3, and the triggers 7 are also retracted into the carriage 3 by the drive motors 9 so that the shipbuilding scaffolding unit may have the smallest dimensions to be lowered through the hatch 22 by a crane (not shown) to a position about 500 mm above the second deck 20 (See FIG. 5 (A) and FIG. 6 (G) ). Next the triggers 7 (or either of the right or left triggers depending upon working conditions) are extended out of the main body 1, and the scaffolding unit is further lowered so that the wheels 4 of the triggers 7 ride on the second deck 20 to support the scaffolding unit. Thereafter, the ropes of the crane are detached from the unit. The drive motors 6 are driven to move the scaffoldig unit 1 below the deck between the hatches toward the transverse bulkhead (See FIGS. 5 (B), 5 (C) and 6 (H) ). Then the platforms are ready for working, and the wings 2 are extended for welding of the undersurface of the upper deck 19 and the side shell plating 27. That is, the upper wing sections 2a are extended at appropriate angles by the motors 11 through the arms 16 (See FIGS. 5 (D) and 6 (I) ). At the front end of the hold, the upper wing sections 2a are made into contact with the side shell plating 27 so that they may be used for welding the upper deck and the side shell platings. Next the lower wing sections 2b are rotated and extended transversely by the motor-and-worm-gearbox assemblies 12 (See FIGS. 5 (E) and 6 (J) ), and the pillars 13 are extended by the motor-and-gearbox assemblies 15. In case of the double-hull structure, the setting of the scaffolding unit is completed when the pillars 13 are extended. Next the platform 14 is extended for welding of the side shell plating 27 (See FIGS. 5 (F) and 6 (K) ).

When the shipbuilding works such as welding are accomplished in one section, the shipbuilding scaffolding unit is moved to the next section by driving the motors 6.

Depending upon where the wings 2 are located, that is, depending upon whether the wings 2 are located below the horizontal upper deck or the inclining wall of the side tank, the angular positions of the wings 2a are appropriately adjusted.

Next, referring to FIGS. 7 – 12, the second embodiment of the shipbuilding scaffolding unit in accordance with the present invention will be described. The shipbuilding scaffolding unit shown in FIG. 7 is adapted to run on the inner bottom plating 21 between the second deck 20 and the inner bottom 21.

The platform unit comprises, in general, a main body 31 which runs on the bottom, has a plurality of working platforms, and wheels, the overall dimensions being less than those of a hatch through which the platform unit is lowered into or lifted from the hold; and a pair of wings 32 which are detachably attached to the longitudinal sides of the main body 31, have a plurality of working platforms, rotate and run independently.

As shown in FIGS. 7 – 9, the main body 31 comprises a carriage 33 which has wheels 34 coupled to drive motors 36 through Schmidt type couplings 35 for running on the inner bottom, and an uppper and lower working platforms 37 mounted on the carriage 3. Various machines for shipbuilding such as welding machines and the like are supported on the working platforms 37. As described above, the overall dimensions of the main body 31 are so determined as to be lowered or lifted through the hatch.

As shown in FIGS. 7 – 9, each of the wings 32 which are disposed on the longitudinal sides of the main body 31, comprises a carriage 38 having wheels 39 coupled to drive motors 40, a pair of telescopic columns 41 whose lower ends are pivoted to the carriage 38 so as to be inclined in the direction of the travel of the carriage 38, and an upper, middle and lower working platforms 42, the upper working platform being fixed to the upper ends of the columns 41 and being extended or retracted horizontally. A motor 43 is provided for each column 41 for raising or lowering it to any angular position, and appropriate members are interposed between the outer cylinders of the telescopic columns 41 for mounting thereon screw rods 44 and drive motors 45 for extending or retracting the telescopic columns 41.

As shown in FIG. 10, at the center of the carriage 38 is disposed a rotary air cylinder 46 whose upper periphery is toothed. The rotary air cylinder 46 is rotated by a motor 47. A pedestal 49 is fixed to the lower end of a piston rod of the air cylinder 46 so that when the air under pressure is introduced into the upper chamber of the air cylinder 46, the pedestal 49 is pressed against the inner bottom 21, and then the carriage 48 is raised. By the motor 47, the carriage is rotated. A motor 48 is provided for maintaining the working platform horizontally. Welding machines and the like may be also supported on the wings 32.

As described above, the wings 32 may be detachably attached to the longitudinal sides of the main body 31 by suitable means. For example, the wing 32 is attached to the main body 31 at four points with one eye plate and bolts on the side of the main body and a plurality of eye plates coupled like a chain on the side of the wing so that the attachment or detachment of the wing may be facilitated even when the wing is lifted by the air cylinder 46.

Next the mode of operation will be described. In order to lower or lift the shipbuilding scaffolding unit with the construction described above through the hatch, the wings 32 are assembled compact in size on the longitudinal sides of the main body 31. In operation, the wing 32 may be detached from the main body 31, extended and inclined as the needs demand. Alternatively, the wing 32 may be extended and inclined to an angular position while it is attached to the main body 31 as shown at the left in FIG. 7. The main body 31 may be used as the working platforms for welding the undersurface of the deck between the hatches and the transverse bulkheads, and the wing 32 is located below the deck outside of the hatch for welding the undersurface of the second deck 20 and the side shell plating 27.

More particularly, the scaffolding unit with the wings 32 detachably attached to the main body 31 is lowered through the hatch 22 to be placed on the inner bottom 21 for running in the longitudinal direction. Thereafter, the motors 36 are driven to move the scaffolding unit toward the transverse bulkhead, and the motors 43 are driven to incline the columns 41 toward the side shell plating 27. Thereafter, the motors 45 are driven to extend the columns 41 for welding of the undersurface of the second deck 20 and the side shell plate 27, and then the motors 48 are driven to maintain the platforms 42 horizontally, and the wings 32 are maintained as shown at the left in FIG. 7.

After the completion of one section, the wings 32 are retracted to their inoperative position, and the motors 36 are driven to move the main body 31 to the next section along the centerline.

When there is a deep web bracket 28 between the main body 31 which is located below the deck between the hatches, and the wing 32 which is located below the deck outside of the hatch, it becomes impossible to set the wings 32 for operation when they are attached to the main body 31. Therefore, after the main body 31 is placed upon the inner bottom 21 (See FIG. 11 (A) ), the wing 32 is lifted by the air cylinder 46, and is detached from the main body 31. Thereafter, the motors 40 are driven to move the wing 32 away from the main body (See FIGS. 11 (B) and 12 (F) ). Next the motors 36 are driven to move the main body 31 to a desired position below the deck between the hatches (See FIG. 11 (C) ). The wing 32 is lifted by the air cylinder 46 and is rotated through 90° by the drive motor 47. Thereafter, the wing 32 is lowered so that its carriage 38 may run on the inner bottom, and then the motors 40 are driven to move the wing 32 below the second deck 20 for welding. (See FIGS. 11 (D) and 12 (G) ). When the shipbuilding scaffolding unit is moved close to the transverse bulkhead, the main body 31 is used for welding the transverse bulkhead, whereas the wing 32 has its columns 41 extended and inclined appropriately, and the platform 42 of the wing 32 is horizontally extended and secured in position for welding the second deck 20 and the side shell plating 27. (See FIG. 11 (E) ). When the side shell plate 27 is inclined, the wing 32 is lifted by the air cylinder 46 after the welding of the second deck 20, and is rotated through 90° by the drive motor 47 toward the side shell plating 27. Thereafter, the wing is lowered and moved toward an appropriate position close to the side shell plating 27 for welding. The motors 43 are driven to incline the columns 41 to correspond to the inclination of the side shell plating 27, whereas the motors 45 are driven to adjust the heights of the platforms 42. Furthermore, the motors 48 are driven to maintain horizontally the platforms 42 for welding the side shell plate 27. (See FIG. 12 (H) ).

In the second embodiment described above, the air cylinder 46 is used to lift or lower the wing 32, but it is understood that any other suitable means such as hydraulic cylinders, mechanical jacks or the like may be used. It should be understood that the present invention is not limited to the embodiments described above taken in conjunction with the accompanying drawings, but various modifications and variations can be effected without departing the scope of the present invention.

As described above, the shipbuilding platform unit in accordance with the present invention comprises in general, a main body which comprises a carriage and a plurality of working platforms erected thereupon, and a pair of wings on the longitudinal sides of the main body for welding of the deck between the hatches, the side shell plates and transverse bulkheads. Therefore, the materials for erection of scaffolding may be minimized; the steps for erection of scaffolding may be also minimized; the welding steps may be minimized since the hull is not damaged by the scaffolding; and the number of steps for installation and removal of various power sources may be minimized. Thus, the defects and problems encountered in the prior art scaffolding constructions can be overcome. Furthermore, the shipbuilding platform unit of the present invention can be easily set in working position, and the shipbuilding works can be safeguarded.

What is claimed is:

1. A shipbuilding scaffolding unit comprising a movable main body having a plurality of working platforms mounted thereon and also having a pair of opposite sides, a pair of wings each of which is detachably connected to one of said sides, each of said wings having a wheeled carriage to provide a separate mobile unit when a wing is detached from the side to which it is connected, means for raising and lowering said carriage, means for rotating the carriage when raised, each of said wings including a pair of telescopic columns having the lower ends thereof pivoted to the associated carriage, work area means including an upper working platform fixed to the upper ends of said pair of columns, and means for raising and lowering said columns.

* * * * *